United States Patent
Araki et al.

(10) Patent No.: US 6,756,099 B2
(45) Date of Patent: Jun. 29, 2004

(54) LAMINATED RESIN MATERIAL

(75) Inventors: Yutaka Araki, Chiba (JP); Shigeru Takano, Chiba (JP); Yukio Nagashima, Chiba (JP)

(73) Assignees: JFE Steel Corporation (JP); K-Plasheet Corporation (JP)

( * ) Notice: Subject to any disclaimer, the term of this patent is extended or adjusted under 35 U.S.C. 154(b) by 0 days.

(21) Appl. No.: 10/332,975

(22) PCT Filed: Feb. 7, 2002

(86) PCT No.: PCT/JP02/01019

§ 371 (c)(1),
(2), (4) Date: Jan. 14, 2003

(87) PCT Pub. No.: WO02/064361

PCT Pub. Date: Aug. 22, 2002

(65) Prior Publication Data

US 2004/0022995 A1 Feb. 5, 2004

(30) Foreign Application Priority Data

Feb. 15, 2001 (JP) ........................... 2001-038235

(51) Int. Cl.[7] .................................. B32B 7/12
(52) U.S. Cl. .................... 428/40.1; 428/41.3; 428/41.5; 428/41.7; 428/41.8; 428/297.4
(58) Field of Search ............... 428/40.1, 41.3, 428/41.5, 41.7, 41.8, 297.4

(56) References Cited

U.S. PATENT DOCUMENTS 5,854,149 A * 12/1998 Nagayama et al. ......... 442/394

FOREIGN PATENT DOCUMENTS

| JP | 8-229941 | * | 9/1999 |
| JP | 2000-15729 | * | 1/2000 |

* cited by examiner

Primary Examiner—Nasser Ahmad
(74) Attorney, Agent, or Firm—Piper Rudnick LLP

(57) ABSTRACT

This invention provides a laminated resin material comprising (1) a fiber reinforced thermoplastic resin layer made by a dispersion method, (2) a gas impermeable resin layer on the fiber reinforced thermoplastic resin layer, and (3) an adhesive resin layer having a melt viscosity of not more than 5000 Pa.s under a shear rate of 10 s$^{-1}$ at 150° C. and not more than 250 Pa.s under a shear rate of 2000 s$^{-1}$ at 150° C. on the gas impermeable resin layer. Among them, a laminated resin material in which the fiber reinforced thermoplastic resin layer made by the dispersion method is an expansion molded stampable sheet and which has a skin material further on the adhesive resin layer is a material excellent in both of the characteristics of adhesion and rigidity and suitable as automotive interior materials.

3 Claims, 1 Drawing Sheet

LAMINATED RESIN MATERIAL

TECHNICAL FIELD

This invention concerns a laminated resin material using a fiber reinforced thermoplastic resin made by a dispersion method as a substrate material which is suitable, for example, to automotive interior materials. Particularly, it relates to a laminated resin material in which the fiber reinforced thermoplastic resin is expansion molded and a skin material is adhered.

BACKGROUND ART

In recent years, weight-reduction in automobiles has been progressed and a demand for the reduction of weight to automotive interior materials has also been increased.

Referring to an example of a headliner material as one of automotive interior materials, fiber reinforced thermoplastic resins made by a dispersion method in which inorganic fibers such as glass fibers are fixed as a core material thereof with a thermoplastic resin such as polyethylene or polypropylene have been used predominantly. This is because it has a merit capable of compatibilizing the weight reduction and the strength. As the fiber reinforced thermoplastic resin made by the dispersion method, it has been known that an expansion moldable stampable sheet is suitable.

The stampable sheet is produced by a dry dispersion method or a wet dispersion method. The stampable sheet by the dry dispersion method is formed by dispersing discontinuous reinforcing fibers and thermoplastic resin fibers or particles in a gas phase to form a non-woven fabric-like precipitates (webs), and then heating and pressuring them to solidify into a sheet-form. This is disclosed, for example, in JP-A-2-169632. On the other hand, the stampable sheet by the wet dispersion method is formed by dispersing discontinuous reinforcing fibers and thermoplastic resin fibers or particles in a liquid medium such as water or bubbles, making non-woven fabric-like precipitates (webs) from liquid dispersion and then heating and pressurizing them to solidify into a sheet-form. This is disclosed, for example, in JP-B-55-9119 or JP-A-60-58227.

The stampable sheet can be shaped easily by heating to a temperature higher than the melting point of the thermoplastic resin as a matrix. In the stampable sheet, reinforcing fibers are opened to monofilament state and piled. Accordingly, when the thermoplastic resin of the matrix is melted, it tends to resume the state of webs before solidification owing to the rigidity of the reinforcing fibers or the like to recover the thickness near the thickness of the web. A molding product with an increased thickness can be obtained utilizing the nature described above by placing a thermally expanded stampable sheet in a die, compressing the same while adjusting a clearance of the die such that voids are left after solidification and cooling in the molding product and then cooling and solidifying the product. Such a molding method is referred to as expansion molding which is shown, for example, in JP-A-4-331138. The obtained molding product (hereinafter also referred to as an expanded molding product) has a three dimensional network structure in which reinforcing fibers are dispersed in random directions and entangled. This is a porous body in which crosslinked reinforcing fibers are secured with the thermoplastic resin.

Along with development of such expansion molding products, with a view point of providing further weight reduction and high rigidity, the expansion molding products have been utilized recently, for example, as the core material for automotive interior materials. For example, a laminated product obtained by disposing an adhesive layer on one side of a stampable sheet, laminating a skin material such as a non-woven fabric on the adhesive layer in a state of thermally expanding the stampable sheet, compressing the same to a desired thickness, bonding the stampable sheet with the skin material, integrating and then expansion molding the same (hereinafter also referred to as an expansion molded laminated-product) has been utilized as automotive headliner materials. As apparent from the example of the application use described above, the automotive interior material using the stampable sheet is required to have not only high rigidity but also high adhesion strength between the stampable sheet and the skin material. For obtaining high rigidity, there is a method of expansion molding the stampable sheet to increase the thickness of the interior material. That is, since the rigidity is in proportion with the cube of the thickness, upon expansion molding of the stampable sheet (the compression ratio is decreased) when a clearance is increased, the thickness of the interior material is increased to enhance the rigidity.

However, in a case of increasing the clearance during molding for enhancing the rigidity, since the compression ratio is small, the adhesion pressure is also decreased, so that the adhesion strength between the stampable sheet and the skin material can not always be said sufficient. On the other hand, when the clearance during molding is decreased (compression ratio is increased), the adhesion strength naturally increases but high rigidity can no more be obtained since the thickness of the interior material is decreased. As described above, the rigidity and the adhesion of the skin material are contrary to each other and it is difficult to obtain an expansion molded laminated-product capable of sufficiently satisfying both of them.

In a case of adhering a skin material by way of an adhesive resin to a porous material such as an expansion molded stampable sheet, a thermoplastic resin is preferably used for the adhesive resin. It has been known so far that the adhesion with the skin material is improved, that is, adhesion strength is increased more by the use, for example, of low density polyethylene with lower melt viscosity as the adhesive resin. As more concrete examples, there are proposed a thermoplastic resin film having a melt flow rate (hereinafter may be simply referred sometimes also as MFR) of 0.5 g/10 min or more (JP-A-7-9632), a polyethylenic resin having MFR of 5.0 to 30.0 g/10 min (JP-A-7-68721), a thermoplastic resin film having MFR of 3 g/10 min or more (JP-A-8-164562), a linear low density polyethylene having MFR of 3 g/10 min or more (JP-A-2000-15729) and the like. A resin having a higher MFR has higher fluidity and lower melt viscosity.

However, when the present inventors have examined adhesion between the expansion molded stampable sheet and the skin material by using a low density polyethylene having an MFR of 15 g/10 min as the adhesive resin, satisfactory adhesion strength could not always be obtained. It should be noted that the adhesive resin used belongs to a thermoplastic resin having an MFR of 0.5 g/10 min or more as proposed in JP-A-7-9632 described above.

Then, the present inventors have made earnest study on the cause described above and, as a result, have found that reduction of the melt viscosity of the adhesive resin at a low shear rate (for example, shear rate: $10\ s^{-1}$) is important for increasing the adhesion strength with the skin material while increasing the thickness of the expansion molded laminated-product as it is (low compression ratio during molding), and have accomplished this invention.

Generally, the melt viscosity of thermoplastic resin has a shear rate dependency as shown in FIG. 1. That is, under the constant condition for the temperature, the melt viscosity is higher when the shear rate is lower, whereas the melt viscosity is lower in a case where the shear rate is higher.

Any of MFR proposed in the prior art described above is a measured value in a high shear rate region usually of 2000 to 10000 s$^{-1}$ of shear rate.

However, the shear rate dependency on the melt viscosity of the thermoplastic resin differs variously depending, for example, on the kind and the molecular weight of the resin. For example, even when the melt viscosity in the high shear rate region is relatively lower compared with the melt viscosity of other resins, the melt viscosity in the low shear rate region is not always lowered to a same extent. As schematically shown in FIG. 1, the melt viscosity between the resins may sometimes be reversed depending on the case. The present inventors have found that the adhesive strength relative to the skin material can be increased by the use of a thermoplastic resin having a lower melt viscosity in the low shear rate region. It has been found that the rigidity can be maintained as it is and, in addition, the adhesion strength with the skin material is also improved while maintaining high rigidity by the use of such an adhesive resin, even when the thickness of the expansion molded laminated-product is increased.

An object of this invention is to provide a laminated resin material excellent in the adhesion with a skin material, having high rigidity and reduced in the weight, as well as a precursor thereof.

DISCLOSURE OF THE INVENTION

This invention provides a laminated resin material comprising: (1) a fiber reinforced thermoplastic resin layer made by a dispersion method, (2) a gas impermeable resin layer on the fiber reinforced thermoplastic resin layer, and (3) an adhesive resin layer having a melt viscosity of not more than 5000 Pa.s under a shear rate of 10 s$^{-1}$ at 150° C. and not more than 250 Pa.s under a shear rate of 2000 s$^{-1}$ at 150° C. on the gas impermeable resin layer.

In the laminated resin material, the fiber reinforced thermoplastic resin layer made by the dispersion method described above is preferably one of members selected from the group consisting of stampable sheets and webs thereof.

Further, any of the laminated resin layers preferably includes those in which the fiber reinforced thermoplastic resin layer made by the dispersion method is an expansion molded stampable sheet, and which further has a skin material on the adhesive resin layer.

BEST MODE FOR PRACTICING THE INVENTION

One of the embodiments according to this invention is a laminated resin material comprising: (1) a fiber reinforced thermoplastic resin layer made by a dispersion method, (2) a gas impermeable resin layer on the fiber reinforced thermoplastic resin layer, and (3) an adhesive resin layer having a melt viscosity of not more than 5000 Pa.s under a shear rate of 10 s$^{-1}$ at 150° C. and not more than 250 Pa.s under a shear rate of 2000 s$^{-1}$ at 150° C. on the gas impermeable resin layer.

In the laminated resin material, the fiber reinforced thermoplastic resin layer made by the dispersion method described above preferably includes one of members selected from the group consisting of stampable sheets and webs to be used for the stampable sheet. Further, in the laminated resin material according to this invention, the gas impermeable resin layer and the adhesive resin layer may be formed on at least one surface of the fiber reinforced thermoplastic resin layer made by the dispersion method as a substrate material. Such laminated resin material can be utilized as automotive interior materials, for example, by adhering a skin on the adhesive resin layer. As will be described later, those formed by expansion molding of the fiber reinforced thermoplastic resin layer made by the dispersion method can be used suitably as the interior material.

Figure 1:
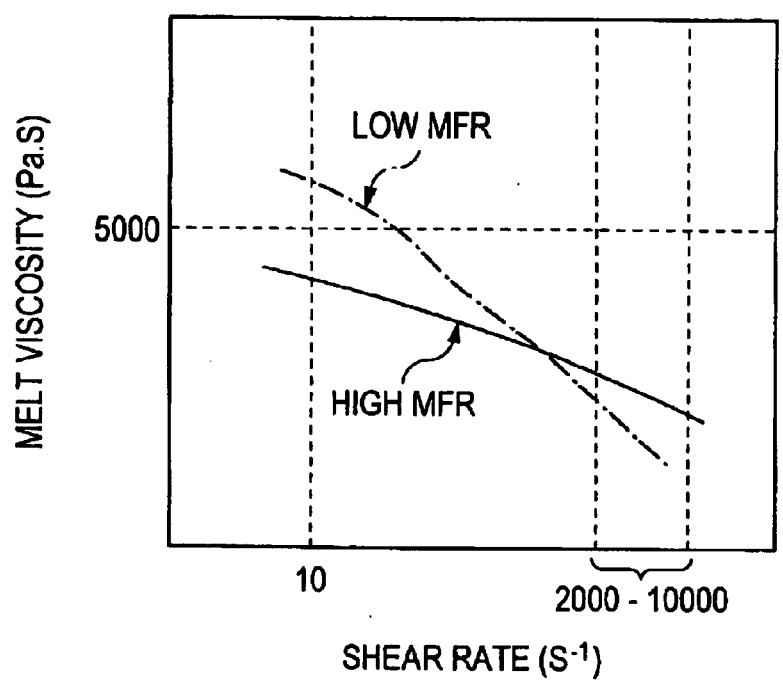
FIG. 1 is a schematic view showing an example of a relation between a shear rate and a melt viscosity.
Figure 2:
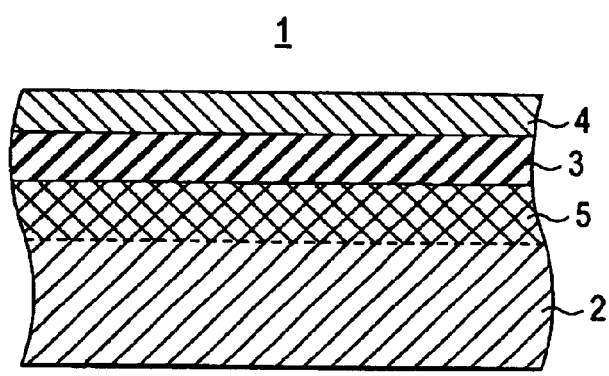
FIG. 2 is a cross sectional view showing the outline of a laminated resin material according to this invention in a case of using a stampable sheet as a fiber reinforced thermoplastic resin layer made by dispersion method.

FIG. 2 schematically shows the laminated resin material according to this invention in a case of using a stampable sheet as the fiber reinforced thermoplastic resin layer made by the dispersion method as an example. That is, the laminated resin material 1 is a laminate having a gas impermeable resin layer 3 on the surface of a stampable sheet 2, and an adhesive resin layer 4 having a predetermined melt viscosity formed on the gas impermeable resin layer 3.

(Fiber Reinforced Thermoplastic Resin Layer Made by Dispersion Method)

The fiber reinforced thermoplastic resin layer made by the dispersion method according to this invention comprises dispersed or precipitated reinforcing fibers secured with thermoplastic resin fibers and is prepared without melting and kneading the reinforcing fibers and the thermoplastic resin. For example, it can include a resin impregnated sheet formed by impregnating a thermoplastic resin to a laminate of reinforcing fibers, those formed by laminating or weaving reinforcing fibers deposited with a thermoplastic resin and then fusing or boding them, a resin-impregnated glass board, and the stampable sheets, webs to be used for the stampable sheets described above and, further, resin foams having open cells incorporating or laminating reinforcing fibers. The resin foams can include, for example, foams of thermoplastic resins such as polyethylene, polystyrene and polypropylene. As the fiber reinforced thermoplastic resin made by the dispersion method, stampable sheets or webs to be used for the stampable sheets corresponding to the precursors thereof are preferred. The feature of the fiber reinforced thermoplastic resin made by the dispersion method according to this invention resides in that the length of the fibers contained is longer compared with that of the fibers of fiber reinforced thermoplastic resins formed by melting and kneading the reinforcing fibers which have been referred to long since as "FRP" and the thermoplastic resin. Referring to the stampable sheet as an example those, more typically, having an average length of about 5 to 30 mm and an aspect ratio of about 100 or more for the reinforcing fibers contained can be mentioned as preferred examples. In this invention, a thermosetting resin may also be mixed with the thermoplastic resin. Further, a thermosetting resin can also be used instead of the thermoplastic resin.

The stampable sheet suitable as a fiber reinforced thermoplastic resin layer made by the dispersion method according to this invention is a sheet obtained by heating the non-woven fabric-like web prepared by the dry method or the wet method as described above and then cooling the same under pressure. The blending ratio between the reinforcing fiber and the thermoplastic resin is preferably 20/80 to 70/30, particularly, 30/70 to 60/40 by mass ratio since an expansion molding product of high mechanical strength such as flexural strength and flexural modulus can be obtained. The stampable sheet may be incorporated, for example, with additives such as antioxidant, light fast stabilizer, metal inactivator, flame retardant, carbon black and colorant.

The thermoplastic resin as the main ingredient of the stampable sheet also has a function of fixing strands or intersections between each of reinforcing fibers. Such resin can include, for example, polyolefin such as polyethylene and polypropylene, polystyrene, polyvinyl chloride, polyethylene terephthalate, polycarbonate, polyamide and polyacetal. Further, copolymers such as ethylene—vinyl chloride copolymer, ethylene—vinyl acetate copolymer, styrene—butadiene—acrylonitrile copolymer, or thermoplastic elastomers based, for example, on EPM or EPDM may be used alone or as a combination of two or more of them. Since polyolefin such as polyethylene or polypropylene has excellent strength, rigidity and moldability, it is preferred and, particularly, polypropylene with good balance for such three characteristics and of a reduced cost is preferred. Among them, a polypropylene having MFR [measuring conditions: according to JIS K6758, 210° C., 21.18 N (2.16 kgf)] of 1 to 200 g/10 min is preferred. With a view point of improving the strength of the stampable sheet, it is preferred to use thermoplastic resins applied with modification treatment such as graft modification with a compound, for example, an acid such as an unsaturated carboxylic acid (maleic acid, acrylic acid or the like), an unsaturated carboxylic acid anhydride (maleic anhydride or the like), or epoxy compounds in combination in order to improve adhesiveness of reinforcing fibers and thermoplastic resin.

Reinforcing fibers as another main ingredient constituting the stampable sheet may be any of inorganic fibers or organic fibers, or composite fibers of them. The inorganic fibers can include, for example, glass fibers, carbon fibers, boron fibers, stainless steel fibers and other metal fibers. The organic fibers can include, for example, alamide fibers, polyester fibers, polyamide fibers and wooden fibers. They may be used alone or as a combination of two or more of them. Among all, glass fibers capable of providing high reinforcing effect at a reduced cost are particularly preferred. The fiber length of the reinforcing fibers is preferably from 5 to 30 mm, further preferably, from 10 to 26 mm with a view point of ensuring the reinforcing effect, the expandability and the shaping property. The diameter of the reinforcing fibers is preferably from 5 to 30 μm and, further preferably from 10 to 25 μm in order to ensure the reinforcing effect and the expandability. Further, for improving the wetability and the bondability between the reinforcing fibers and the thermoplastic resin, reinforcing fibers applied with a surface treatment such as with silane coupling agent are preferred.

(Gas Impermeable Resin Layer)

The gas impermeable resin layer has a function of ensuring the gas impermeability of the fiber reinforced thermoplastic resin layer made by the dispersion method or the expansion molding product thereof, and preventing the adhesive resin laminated on the gas impermeable resin layer from impregnating into the fiber reinforced thermoplastic resin layer or the expansion molding product thereof described above as the substrate. For example, in a case of application use for the headliner material of automobiles, it can also prevent passage of air thereby preventing the headliner material from contamination. The thickness of the gas impermeable resin layer is preferably 5 μm or more and, more preferably, 10–50 μm in order to maintain the gas impermeability. Further, the gas impermeability can be measured, for example, by the method according to ASTM-D 737 and those of substantially 0 $cm^3/cm^2 \cdot s$ are used in this invention.

The gas impermeable resin layer may be either a thermoplastic resin or a thermosetting resin but the thermoplastic resin is preferred in view of the moldability. That is, for example, at least one member selected from the group consisting of polyamide, polyethylene terephthalate, and ethylene-vinyl alcohol copolymer is preferred. For the gas impermeable resin layer, those resins identical with the thermoplastic resin used as the main ingredient of the stampable sheet can be used. More preferred are stampable sheets or expansion molded products thereof not melted at a molding temperature thereof. In other words, those of a melting point higher than the melting point of the thermoplastic resin as the main ingredient of the stampable sheet are preferred. For example, in a case where the matrix resin for the stampable sheet is polypropylene, the gas impermeable resin layer is preferably constituted, for example, with a polyamide or polyethylene terephthalate.

Since adhesion between the fiber reinforced thermoplastic resin layer made by the dispersion method and the gas impermeable resin layer includes adhesion also by so-called self adhesion, thermo fusion or adhesion with anchoring in this invention, adhesives are not always required. However, in order to improve the workability or the adhesion strength, use of the adhesives is preferred. In such a case, the gas impermeable resin layer 3 is bonded by way of the adhesive 5 to the stampable sheet 2 and the adhesive resin layer 4 as the constituent factor of this invention is formed on the gas impermeable resin layer 3 to obtain a laminate. In this case, the adhesive 5 is sometimes observed as a layer. The adhesive 5 is preferably a resin identical or similar with the matrix resin constituting the fiber reinforced thermoplastic resin made by the dispersion method. "Similar" means copolymer, composition or graft-modified product to the homopolymer. Particularly, in a case of using polypropylene as the matrix resin for the fiber reinforced thermoplastic resin made by the dispersion method, use of a polyolefin is preferred in view of the adhesion to the polypropylene. Polypropylene is further preferred and an acid-modified polypropylene is further more preferred. Further, the same adhesive as the adhesive resin layer to be described later can also be used.

(Adhesive Resin Layer)

The adhesive resin layer of the laminated resin material according to this invention is formed for adhering the skin material thereon such that the gas impermeable resin layer described above and the skin material are not peeled.

The resin constituting the adhesive resin layer in this invention is a thermoplastic resin having a melt viscosity of not more than 5000 Pa.s under a shear rate of $10\ s^{-1}$ at 150° C. and a melt viscosity of not more than 250 Pa.s under a shear rate of $2000\ s^{-1}$ at 150° C. More preferred are thermoplastic resins having a melt viscosity of 80 to 4000 Pa.s under a shear rate of $10\ s^{-1}$ at 150° C. and 5 to 240 Pa.s under a shear rate of $2000\ s^{-1}$ at 150° C.

The temperature upon measuring the melt viscosity is defined as 150° C., because the temperature of the adhesive resin upon expansion molding is lowered to about 150° C. Further, when the melt viscosity is not more than 5000 Pa.s at a shear rate of $10\ s^{-1}$ and a melt viscosity is not more than 250 Pa.s at a shear rate of $2000\ s^{-1}$, the skin material tends to intrude easily into the adhesive resin layer to develop an anchoring effect and improve the adhesion strength with the skin material.

The resin of the adhesive resin layer in this invention has an MFR, preferably, of not less than 8 g/10 min and, more preferably, 8 to 250 g/10 min. When MFR is not less than 8 g/10 min, the fluidity of the adhesive resin is favorable and it is bonded easily with the skin material.

Usually, the thickness of the adhesive resin layer in this invention is, preferably, not less than 10 μm and, more preferably, 30 to 100 μm.

There is no particular restriction on the kind of the thermoplastic resin in the adhesive resin layer. It can include, for example, low density polyethylene, medium density polyethylene, high density polyethylene, linear low density polyethylene, ethylene vinyl acetate copolymer, ethylene ethyl acrylate copolymer, ethylene acrylic acid copolymer, ethylene methyl acrylate copolymer, ethylene methyl methacrylate copolymer, ethylene—methacrylic acid copolymer or a mixture thereof. For example, polyethylenes of different melt viscosity can properly be combined and used. Polyolefinic resins such as polyethylene and polypropylene are preferred and, among them, it is preferably at least one member selected from the group consisting of linear low density polyethylene, low density polyethylene and polypropylene. Polyethylene is particularly preferred since it has low melting point and is available at a reduced cost.

The melting point of the resin in the adhesive resin layer in this invention is preferably 90 to 140° C. When the melting point is not lower than 90° C., adhesion with the skin material can be maintained even at a high temperature, and the adhesive resin is less solidified during compression molding under cooling at 140° C. or lower, so that anchoring effect can be developed easily.

In the case of using several kinds of thermoplastic resins of different melt viscosities in admixture as the adhesive resin, since it is difficult to form a thermoplastic resin with a low melt viscosity at a shear rate of $10 \text{ s}^{-1}$ or $2000 \text{ s}^{-1}$ singly into a film, a thermoplastic resin of higher melt viscosity at a shear rate of $10 \text{ s}^{-1}$ or $2000 \text{ s}^{-1}$ is preferably mixed to control the melt viscosity of the mixed resin to not more than 5000 Pa.s at a shear rate of $10 \text{ s}^{-1}$ and to not more than 250 Pa.s at a shear rate of $2000 \text{ s}^{-1}$. There is no particular restriction on the mixing method of the adhesive resin. They may be kneaded upon forming the resin into the film and may be copolymerized or dry blended. Upon mixing, the melt viscosity of one of the thermoplastic resins is more than 5000 Pa.s at a shear rate of $10 \text{ s}^{-1}$ and more than 250 Pa.s at a shear rate of $2000 \text{ s}^{-1}$.

In this invention, an intermediate layer comprising a resin may further be interposed between the gas impermeable resin layer and the adhesive resin layer for enhancing adhesion between both of the layers, conforming the adhesion or melting both of the layers to control the fluidity.

(Laminated Resin Material Using Expansion Molded Stampable Sheet as a Substrate)

Figure 3:
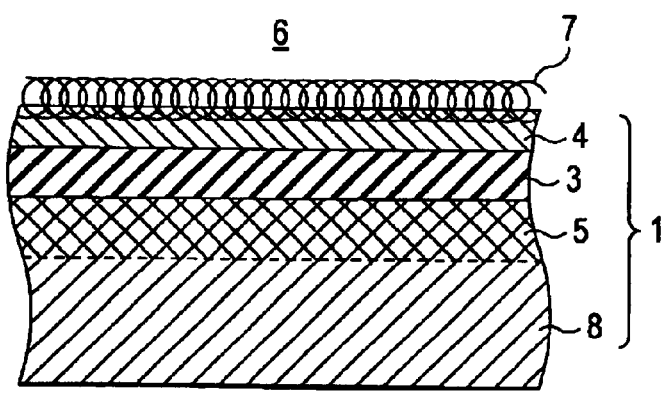
FIG. 3 is a cross sectional view showing the outline of a laminated resin material (expansion molded laminated-product) according to this invention in a case where a skin material is adhered on the adhesive resin layer.

Another important feature of this invention resides in any one of the laminated resin materials described above in which the fiber reinforced thermoplastic resin layer made by the dispersion method is an expansion molded stampable sheet, and a laminated resin material further having a skin material on the adhesive resin layer. Recently, such laminated resin layers (also referred to as expansion molded laminated-products) have been used suitably to automotive interior materials. FIG. 3 schematically shows an expansion molded laminated-product 6. That is, the laminated resin material 6 has a gas impermeable resin layer 3 described above on a expansion molded stampable sheet 8, and a skin material 7 bonded by way of the adhesive resin layer 4 described above on the gas impermeable resin layer 3. FIG. 3 shows an example of using the same adhesive 5 as described above between the expansion molded stampable sheet 8 and the gas impermeable resin layer 3. Since the fiber reinforced thermoplastic resin by the dispersion method is the expansion molded stampable sheet, it is porous in which intersections of the reinforcing fibers are bonded with the thermoplastic resin, so that it is reduced in the weight and excellent in the mechanical properties such as rigidity.

(Skin Material)

The skin material in this invention has an aim for decoration and protection. As the skin material, woven fabrics or non-woven fabrics comprising natural fibers such as plant fibers and animal fibers or synthetic fibers such as cellulose acetate series, polyamide series, polyester series, polyacryl series and polypropylene series fibers are preferred. Non-woven fabrics of thermoplastic resin are more preferred. Skin materials using the fibers are preferred since the anchoring effect that the adhesive resin layer is melted and intrudes between each of the fibers of the skin material is large to enhance the adhesion. However, so long as adhesion with the adhesive resin layer is obtained, it is not restricted to the skin material using the fibers. For example, when a foamed sheet having open cells such as polyurethane foams is disposed to the surface to be adhering with the core material of the woven fabric or non-woven fabric, it is possible to absorb unevenness of the core material, enhance the aesthetic property of the skin material surface and can provide cushioning property.

(Preparation Method for Laminated Resin Material)

The laminated resin material is prepared, for example, by the following method. This example shows, at first, a case in which the fiber reinforced thermoplastic resin layer made by the dispersion method is a stampable sheet or a web to be used for stampable sheet.

A thermoplastic resin and reinforcing fibers are dispersed in an aqueous solution containing a surfactant in which fine air bubbles are dispersed. Solid contents in the liquid dispersion are precipitated by dewatering the obtained liquid dispersion through a porous support. Then, the precipitates are dried to obtain a uniform web. The web comprises, for example, a thermoplastic resin and reinforcing fibers in which particles of the thermoplastic resin are uniformly dispersed in the reinforcing fibers, and the thickness thereof is about 1 to 10 mm.

Then, a multi-layered film obtained by laminating an adhesive with the web, a gas impermeable resin and an adhesive resin in this order is laminated to the web such that the adhesive resin layer is on the outer surface. The laminate is melted by heating to a melting point or higher of the thermoplastic resin in the web and pressurized by a cooling plate and solidified into a sheet form, to obtain a dense laminated resin material. By the processing, the web is formed into a material equivalent with the so-called stampable sheet. When the thermoplastic resin used is polypropylene, the heating temperature is about 170 to 230° C., more preferably, about 190 to 210° C. Not more than 230° C. is preferred since no coloration or lowering of the strength by the decomposition of polypropylene can be suppressed. The pressure by the cooling plate is preferably 0.01 to 5 MPa in order to obtain a dense laminated resin material. Rupture of the reinforcing fibers can be suppressed easily at 5 MPa or less.

Further, the laminated resin material can be prepared also by heating and then pressurizing under cooling the web described above to once prepare a stampable sheet and heating the stampable sheet again, laminating the multi-layered film described above and pressurizing and cooling them. The multi-layered film described above comprising the adhesive, the gas impermeable resin and the adhesive resin is prepared by a known production method such as a dry lamination method or a co-extrusion method.

Then, a laminated resin material in which the fiber reinforced thermoplastic resin layer made by the dispersion method is the expansion molded stampable sheet and which has a skin material further on the adhesive resin layer is to be exemplified successively.

The laminated resin material obtained in the example described above is re-heated and expanded at a temperature of the melting point of the matrix resin or higher. Then, after laminating the skin material on the expanded stampable sheet, they are placed in a molding die. Successively, they are pressure molded integrally while controlling the height of the die spacer and the clamping height of the press die to obtain a laminated resin material (expansion molded laminated-product) having a predetermined thickness. The heating temperature upon expansion molding is about 170 to 230° C. and, preferably, about 190 to 210° C. in a case where the matrix material is polypropylene. The heating method includes a hot plate heating, infrared heating, near infrared heating or blow heating with no particular restriction. The die temperature may be not higher than coagulation point of the thermoplastic resin and usually it is from room temperature to about 60° C. with a view point of handlability and productivity. While different depending on the shape of the molding product, a preferred molding pressure is usually from 0.01 to 5 MPa.

EXAMPLE

Example 1

Polypropylene particles and glass fibers described below were mixed at 50:50 dry mass % ratio in a foamed liquid and dispersed. Then, the foamed liquid was filtered under suction and dried to obtain a web with a basis weight of 700 g/m² (a kind of fiber reinforced thermoplastic resin layer made by dispersion method) Polypropylene: MFR 65 g/10 min, melting point 162° C. Glass fiber: 25 mm length, 17 μm diameter Then, a multi-layered film formed by separately laminating polypropylene (melting point 160° C., 40 μm thickness) as an adhesive, 6-nylon (melting point 215° C., 25 μm thickness, gas impermeability : 0 cm³/cm²·s) as a gas impermeable resin thereon and an adhesive resin of the constitution shown in Table 1 further on the gas impermeable resin, is laminated on one surface of the obtained web to form a laminated resin material. The laminated resin material was laminated such that the adhesive resin layer of the constitution shown in Table 1 was formed as an outer layer. Further, the laminated resin material having the web as the substrate was heated to 210° C., then placed on a cooling plate at 25° C., and compression molded under pressure of 0.3 MPa into a stampable sheet in which polypropylene and reinforcing fibers were integrally solidified densely and, at the same time, the multi-layered film was adhered firmly on one side of the stampable sheet to obtain a laminated resin material (refer to FIG. 2).

Further, the laminated resin material having the thus obtained stampable sheet as the substrate was heated to 210° C., the polyester non-woven fabric described below was laminated as the skin material on the adhesive resin layer and placed in an expansion molding die (temperature:room temperature). Then, a flat plate-like laminated resin material in which the stampable sheet was expansion molded, and the skin material was firmly adhered was obtained (expansion molded laminated-product) by closing the die at a pressure of 0.02 MPa (refer to FIG. 3). The thickness of the expansion molded stampable sheet portion was 3.3 mm. Polyester non-woven fabric: Basis weight 180 g/m², with no hot melt layer For the obtained expansion molded laminated-product, the following bending test, peeling strength of the skin material at a normal temperature and hot adhesion retainability test in a high temperature atmosphere were conducted. The results of the test are shown in Table 2.

(Bending Test)

A test specimen of 150 mm length and 50 mm width was cut out from an expansion molded laminated-product. Using the test piece, a 3-point bending test of applying a load on the side of the skin material at 100 mm spun and at 50 mm/min cross head speed was conducted and the maximum load and the elasticity gradient were measured. The measuring temperature was 23° C.

(Peeling Strength for Skin Material)

A test specimen of 150 mm length and 25 mm width was cut out from an expansion molded laminated-product. The skin material was peeled partially from the end of the test piece for 50 mm length. Then, the peeled skin portion and the peeled main body portion were gripped respectively by chucks and pulled in the direction of 180° to conduct a peeling test. The measuring temperature was 23° C. and the pulling rate was 50 mm/min.

(Hot Adhesion Retainability Test)

A test specimen of 150 mm length and 25 mm width was cut out from an expansion molding laminationed-product. Then, the skin material was partially the peeled from the end of the test piece for 75 mm length. Then, peeled main body portion was gripped, a constant weight of 100 g was applied to the peeled skin portion and left in an atmosphere at 85° C. The peeling state for the skin material after 24 hours was visually observed.

(MFR)

MFR was measured according to JIS K6758.

(Melt Viscosity)

Melt viscosity was measured by using a flow tester while varying the load.

Examples 2–9, Comparative Examples 1–7

Laminated resin materials (plate-like expansion molded laminated-products) were prepared in the same method as in Example 1 except for using multi-layered films in which the adhesive resin (A) was replaced with adhesive resins B-J shown in Table 1 in Example 1. The results for the performance test of the obtained expansion molded laminated-products are shown together with the thickness of the expansion molded stampable sheet portion in Table 2.

It can be seen from the results in Table 2 that the bending characteristic is excellent and the balance of adhesion strength relative to the skin material at normal temperature and high temperature is favorable in the case of using the thermoplastic resin having a melt viscosity of not more than 5000 Pa.s under a shear rate of 10 s⁻¹ at 150° C. and not more than 250 Pa.s under a shear rate of 2000 sa⁻¹ at 150° C. as an adhesive resin layer. Further, the gas impermeability of the expansion molded laminated-products obtained in all of examples and comparative examples were 0 cm³/cm²·s and they were gas impermeable.

Further, the feeling of the skin material in the ion molded laminated-product according to this ion was substantially identical with the state before on.

TABLE 1

| | | Melt viscosity (Pa.s) | | | |
|---|---|---|---|---|---|
| Symbol | Adhesive resin Kind and blending ratio | Under a shear rate of 10 s⁻¹ at 150° C. | Under a shear rate of 2000 s⁻¹ at 150° C. | MFR (g/ 10 min) | Layer thickness (μm) |
| A | LDPE | 120 | 40 | 200 | 50 |
| B | LLDPE | 1900 | 230 | 11 | 50 |
| C | LDPE (MFR:7)/ LDPE (MFR: 200) = 1/1 | 1100 | 82 | 75 | 50 |
| D | LDPE (MFR:50)/ LLDPE (MFR: 50) = 1/1 | 350 | 95 | 50 | 60 |
| E | LDPE (MFR:50)/ EVA (MFR: 4) = 7/3 | 1300 | 145 | 20 | 60 |
| F | LDPE (MFR:200)/ acrylic acid modified PE (MFR:8) = 4/6 | 2100 | 131 | 40 | 60 |
| G | LDPE | 10000 | 150 | 15 | 50 |
| H | HDPE | 15200 | 300 | 4 | 80 |
| I | Acrylic acid modified PE | 11450 | 280 | 8 | 60 |
| J | LLDPE | 8200 | 300 | 4 | 60 |

LDPE : Low density polyethylene
LLDPE : Linear low density polyethylene
HDPE : High density polyethylene

TABLE 2

| | Adhesive resin | Thickness of expansion molded stampable sheet (mm) | Maximum bending load (N) | Elasticity gradient (N/mm) | Adhesiveness of skin material | |
|---|---|---|---|---|---|---|
| | | | | | Peeling strength at 25° C. (N/25 mm) | Hot adhesion* |
| Example | | | | | | |
| 1 | A | 3.3 | 25.5 | 3.7 | 17.6 | ○ |
| 2 | B | 3.0 | 24.5 | 3.1 | 7.8 | ○ |
| 3 | C | 3.0 | 24.5 | 3.3 | 11.8 | ○ |
| 4 | C | 3.5 | 24.5 | 4.0 | 6.9 | ○ |
| 5 | D | 2.8 | 22.6 | 3.1 | 12.7 | ○ |
| 6 | D | 3.0 | 26.5 | 3.3 | 8.8 | ○ |
| 7 | D | 3.3 | 25.5 | 3.5 | 6.9 | ○ |
| 8 | E | 2.8 | 21.6 | 2.8 | 7.8 | ○ |
| 9 | F | 3.0 | 23.5 | 3.1 | 8.8 | ○ |
| Comp. Ex. | | | | | | |
| 1 | G | 3.0 | 24.0 | 3.2 | 1.1 | X |
| 2 | H | 3.0 | 24.5 | 3.3 | 0.5 | X |
| 3 | I | 3.0 | 23.5 | 3.0 | 2.0 | X |
| 4 | J | 1.5 | 7.8 | 1.2 | 15.7 | ○ |
| 5 | J | 2.0 | 14.7 | 2.0 | 6.9 | ○ |
| 6 | J | 2.5 | 17.7 | 2.5 | 1.0 | X |
| 7 | J | 3.0 | 23.8 | 3.0 | 0.5 | X |

*○: notpeeled
X: partially or entirely peeled

Industrial Applicability

The laminated resin material according to this invention is reduced in weight and has high rigidity and adhesion strength. Particularly, an expansion molded laminated-product has an excellent balance for rigidity and adhesion with a skin material. Accordingly, it can be applied effectively, for example, to automotive interior materials required for reduced weight and high rigidity, for example, headliner materials or door trim materials.

What is claimed is:

1. A laminated resin material comprising:
   (1) a fiber reinforced thermoplastic resin layer made by a dispersion method,
   (2) a gas impermeable resin layer on the fiber reinforced thermoplastic resin layer, and
   (3) an adhesive resin layer having a melt viscosity of not more than 5000 Pa.s under a shear rate of 10 s$^{-1}$ at 150° C. and not more than 250 Pa.s under a shear rate of 2000 s$^{-1}$ at 150° C. on the gas impermeable resin layer.

2. The laminated resin material as defined in claim 1, wherein the fiber reinforced thermoplastic resin layer made by the dispersion method is one of members selected from the group consisting of stampable sheets and webs to be used for the stampable sheets.

3. The laminated resin material as defined in claim 1, wherein the fiber reinforced thermoplastic resin layer made by the dispersion method is an expansion molded stampable sheet and the material further has a skin material on the adhesive resin layer.

\* \* \* \* \*

UNITED STATES PATENT AND TRADEMARK OFFICE
CERTIFICATE OF CORRECTION

PATENT NO. : 6,756,099 B2
DATED : June 29, 2004
INVENTOR(S) : Araki et al.

It is certified that error appears in the above-identified patent and that said Letters Patent is hereby corrected as shown below:

Title page,
Item [75], Inventors, please add as follows:
-- Hideho Kubo, Chiba, Japan and Seiji Hanatani, Chiba, Japan --.

Column 10,
Line 32, please change "$sa^{-1}$" to -- $s^{-1}$ --;
Line 37, please change "ion" to -- expansion --;
Line 38, please change "ion" to -- invention --; and
Line 39, please change "on" to -- adhesion --.

Signed and Sealed this

Twenty-first Day of December, 2004

JON W. DUDAS
*Director of the United States Patent and Trademark Office*